UNITED STATES PATENT OFFICE
PTO – BOYERS, PA DUTY STATION

---

PAGE NOT AVAILABLE

PATENT NUMBER X5229 FOR THE ISSUE DATE 9/11/1828 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X5229 9-11-1828

[illegible]
[illegible]
[illegible] bedsteads [illegible]
[illegible]

---

[illegible]
[illegible] and Commonwealth of Massachusetts [illegible]
[illegible]

[illegible] constructed, made [illegible]
[illegible] improvement in fastenings for Bedsteads [illegible]
[illegible] fastening specified as follows:

[illegible]
with wood screws. [illegible] inside [illegible] are [illegible]
and permanently [illegible]
[illegible] is made [illegible]
[illegible]
[illegible]
[illegible] durable joint.

[illegible] annexed [illegible] and [illegible]

A, is the outside of the post and mortise [illegible] B is the [illegible]
inside of the post showing the wedge and dovetail [illegible] is an edge view of the
post, showing the wedges. c.c are the dovetail wedges [illegible]
[illegible] C.2. is [illegible]
[illegible] and fastened [illegible] bedstead as

X5229

[illegible]: The side and end pieces are grooved [illegible] from the under side up, so that the square [illegible] the beam will drive firmly into the [illegible] flush with the shoulder [illegible] the under side of the [illegible] pieces. The side and [illegible] pieces have holes bored in the centre of the groove to receive the round end of the beam marked H. The [illegible] part of the beam is filled up with pieces of wood [illegible] by [illegible] from the round, which pieces are [illegible] when the beam is driven, which causes it to remain firm. Another method of fastening the dovetail ends [illegible] the beam to the side and end pieces of the bed stead is, to cast the same [illegible] with [illegible] on the end that [illegible] flush with the underside.

The [illegible] wedges and let in flush with the end of the side [illegible] end pieces, [illegible] with screws [illegible] and through the [illegible] in [illegible] the under side I, is a view of the [illegible] and wedges with the screws.

Another [illegible] is [illegible] the dovetail wedges on a plate [illegible] and [illegible] flush with the end of the side [illegible] piece and [illegible] it with a screw passing through the centre. K gives a view of this plate.

[illegible]

William [illegible]      William Smith.
[illegible]    800    William [illegible].

( [illegible] and [illegible] June 16th, 18[illegible] )